(12) United States Patent
Mori

(10) Patent No.: US 9,062,850 B2
(45) Date of Patent: Jun. 23, 2015

(54) REFLECTING MEMBER AND FLAME SENSOR

(71) Applicant: Azbil Corporation, Tokyo (JP)

(72) Inventor: Raita Mori, Tokyo (JP)

(73) Assignee: Azbil Corporation, Tokyo (JP)

( * ) Notice: Subject to any disclaimer, the term of this patent is extended or adjusted under 35 U.S.C. 154(b) by 118 days.

(21) Appl. No.: 13/799,633

(22) Filed: Mar. 13, 2013

(65) Prior Publication Data

US 2013/0256548 A1    Oct. 3, 2013

(30) Foreign Application Priority Data

Mar. 29, 2012 (JP) .................................. 2012-075847
Nov. 16, 2012 (JP) .................................. 2012-251915

(51) Int. Cl.
  *G01J 1/42* (2006.01)
  *F21V 7/04* (2006.01)
  *G01J 1/04* (2006.01)
  *G02B 19/00* (2006.01)

(52) U.S. Cl.
  CPC ................ *F21V 7/043* (2013.01); *F21V 7/041* (2013.01); *G01J 1/429* (2013.01); *G01J 1/0422* (2013.01); *G02B 19/0095* (2013.01); *G02B 19/0023* (2013.01); *G02B 19/0076* (2013.01)

(58) Field of Classification Search
  USPC .......................................................... 250/372
  See application file for complete search history.

(56) References Cited

U.S. PATENT DOCUMENTS 6,542,118 B2 * 4/2003 Lalezari et al. ............... 342/368
2011/0240871 A1   10/2011 Sugino et al.

FOREIGN PATENT DOCUMENTS

JP   2011-214893 A   10/2011

* cited by examiner

*Primary Examiner* — David Porta
*Assistant Examiner* — Edwin Gunberg
(74) *Attorney, Agent, or Firm* — Troutman Sanders LLP

(57) ABSTRACT

A reflecting member made from a tube-shaped member has an inner peripheral surface that structures a reflecting surface on an axis of the tube-shaped member. A slope, relative to the axis, of a tangent line of the inner peripheral surface in a cross-sectional plane containing the axis changes monotonically along the axis. In relation to a target facing a smaller opening of the tube-shaped member, at a specific distance therefrom, and having a flat region perpendicular to the axis and axially symmetrical relative to the axis, of an electromagnetic radiation incident along the axis from a larger opening of the tube-shaped member, that radiation reflected at a specific location on the larger opening side is incident on one end side of the flat region, and that radiation reflected at a specific location on the smaller opening side is incident on the other end side of the flat region.

5 Claims, 10 Drawing Sheets

REFLECTING MEMBER AND FLAME SENSOR

CROSS REFERENCE TO RELATED APPLICATIONS

This application claims priority to Japanese Patent Application Nos. 2012-075847, filed on Mar. 29, 2012, and 2012-251915, filed on Nov. 16, 2012, the entire contents of which being hereby incorporated herein by reference.

FIELD OF TECHNOLOGY

The present invention relates to a reflecting member that reflects electromagnetic radiation.

BACKGROUND

Conventionally, there are known electron tubes that are used in detecting whether or not there is a flame based on ultraviolet radiation that is emitted from a flame in a combustion furnace or the like. This electron tube is provided with a closing device that is filled with a specific gas and sealed, an electrode support pin that passes through the closing device, and two electrodes supported, parallel to each other, within the closing device by the electrode supporting pin. In this electron tube, when one of the electrodes that is disposed facing a flame is illuminated with ultraviolet radiation in a state wherein a specific voltage is applied between the electrodes through the electrode supporting pin, electrons are emitted from that electrode through the photoelectric effect, and the electrons are stimulated one after another to cause and electron avalanche to the other electrode. Because of this, it is possible to detect the presence of a flame through a change in the impedance between the electrodes, a change in the voltage between the electrodes, measuring the current that flows between the electrodes, or the like.

In such an electrode tube it is necessary to increase the amount of luminescent flux or the density of the incident ultraviolet radiation in order to increase the sensitivity. While simply increasing the diameter of the electron tube would increase the incident ultraviolet radiation, if such a large electron tube were equipped in a combustion furnace device, there would be the risk that this could cause too great a change in the shape or the volume of the combustion furnace, which could have a deleterious effect on the furnace reaction, or the like. Given this, conventionally a lens has been placed between the light source (the flame) and the electron tube, to focus the ultraviolet radiation that is incident on the lens, to achieve an improvement in the amount of flux or the concentration of the ultraviolet radiation that is incident into the electron tube.

However, the materials for lenses that are transparent to ultraviolet radiation (quartz glass, or the like) are expensive, and thus mass production scale-up and cost reductions have been difficult. Given this, in recent years there have been proposals for reflecting mirrors wherein the reflecting surface is formed from a parabolic surface instead of using a lens. See, for example, Japanese Unexamined Patent Application Publication 2011-214893.

However, when the reflecting surface of the reflecting mirror uses a simple parabolic surface, the cross-sectional shape of the focused ultraviolet radiation will be either a point or a hollow circle, so it has been difficult to focus uniformly as a plane. Given this, if, for example, focusing the ultraviolet radiation onto a single point, electrons will be emitted locally from that single point, which will cause the location of emission of the electrons to break down, resulting in a loss of sensitivity in detecting the flame using the electron tube. Because of this, a reflecting member that is able to illuminate a given region uniformly with reflected light wherein electromagnetic radiation, such as ultraviolet radiation, is reflected is desirable.

Given this, an aspect of the present invention is to provide a reflecting member and a flame sensor able to cause reflected electromagnetic radiation to illuminate a given region uniformly.

SUMMARY

In order to solve the problem set forth above, a reflecting member according to the present invention is made from a tube-shaped member having an inner peripheral surface, and structured with a reflecting surface wherein the inner peripheral surface is formed with symmetry on the axis of the tube-shaped member, wherein the slope, relative to the axis, of the tangent of the inner peripheral surface in a cross-sectional plane that contains the axis changes monotonically along the axis, and is positioned relative to a target having a flat region that is positioned facing a smaller opening of the tube-shaped member at a specific distance therefrom, that is perpendicular to the axis, and that has axial symmetry relative to the axis, so that, of the electromagnetic radiation that is incident along the axis from the larger opening of the tube-shaped member and that is reflected by the inner surface, the electromagnetic radiation that is reflected at a specific location at the larger opening side is incident on one end side of the flat region, and the electromagnetic radiation that is reflected at a specific location at the small opening side is incident on the other end side of the flat region.

Here a reflecting member according to the present invention is made from a tube-shaped member having an inner peripheral surface, and structures a reflecting surface wherein the inner peripheral surface is formed with symmetry on the axis of the tube-shaped member, wherein the slope, relative to the axis, of the tangent of the inner peripheral surface in the cross-sectional plane that contains the axis changes monotonically along the axis, and is positioned, relative to a target having a flat region that is positioned facing the smaller opening of the tube-shaped member, at a specific distance therefrom, and that is perpendicular to the axis and that has axial symmetry relative to the axis, so that, of the electromagnetic radiation that is incident along the axis from the larger opening of the tube-shaped member and that is reflected by the inner surface, the electromagnetic radiation that is reflected at the one end on the larger opening side is incident on one end side of the flat region and the electromagnetic radiation that is reflected at the other end, on the small opening side, is incident on the other end side of the flat region.

Here, in this reflecting member, at least one end portion of the inner peripheral surface may form a conical surface.

Moreover, a flame sensor according to the present invention comprises a reflecting member made from a tube-shaped member having an inner peripheral surface, wherein the inner peripheral surface structures a reflecting surface that is formed symmetrically on the axis of the tube-shaped member, and an electron tube having a flat plate-shaped electrode sealed within the tube, wherein: in the reflecting member, relative to an electrode that is disposed perpendicular to the axis and axially symmetrical relative to the axis, of the electromagnetic radiation that is incident along the axis from a larger opening of the tube-shaped member and reflected by the inner surface, that electromagnetic radiation that is reflected at a specific location at the larger opening side is incident on one end of the electrode and the electromagnetic radiation that is reflected from a specific location, at the smaller opening side, is incident on the other end of the electrode.

In the present invention, the reflecting member is made from a tube-shaped member having an inner peripheral surface, and structures a reflecting surface wherein the inner peripheral surface is formed with symmetry on the axis of the tube-shaped member, wherein the slope, relative to the axis, of the tangent of the inner peripheral surface in the cross-sectional plane that contains the axis changes monotonically along the axis, and is positioned, relative to a target having a flat region that is positioned facing the smaller opening of the tube-shaped member, at a specific distance therefrom, and that is perpendicular to the axis and that has axial symmetry relative to the axis, so that, of the electromagnetic radiation that is incident along the axis from the larger opening of the tube-shaped member and that is reflected by the inner surface, the electromagnetic radiation that is reflected at the one end on the larger opening side is incident on one end side of the flat region and the electromagnetic radiation that is reflected at the other end, on the small opening side, is incident on the other end side of the flat region, enabling the reflected light of the electromagnetic radiation that is reflected by the reflecting surface to illuminate the specific region uniformly.

DETAILED DESCRIPTION

Example

The figures will be referenced below to explain in detail Example according to the present invention. Note that the terms "up," "down," "left," and "right" used in the Example do not constrain the orientation of the actual objects, such as in relation to the direction of gravity, but are merely used for convenience in indicating directions in the figures.

<Structure of the Flame Sensor>

Figure 1:
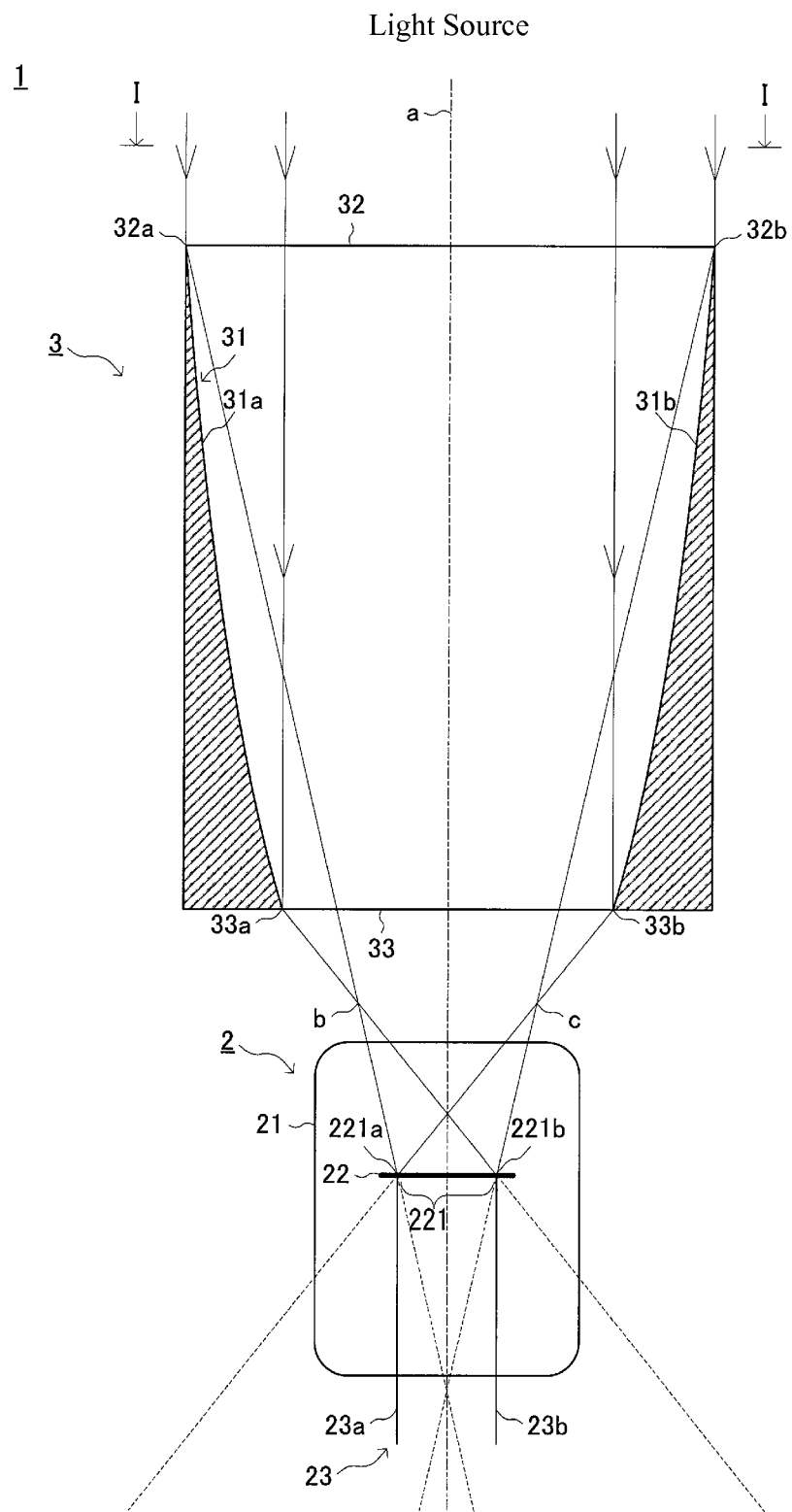
FIG. 1 is a cross-sectional diagram illustrating schematically a structure for a flame sensor according to Example according to the present invention.
Figure 2:
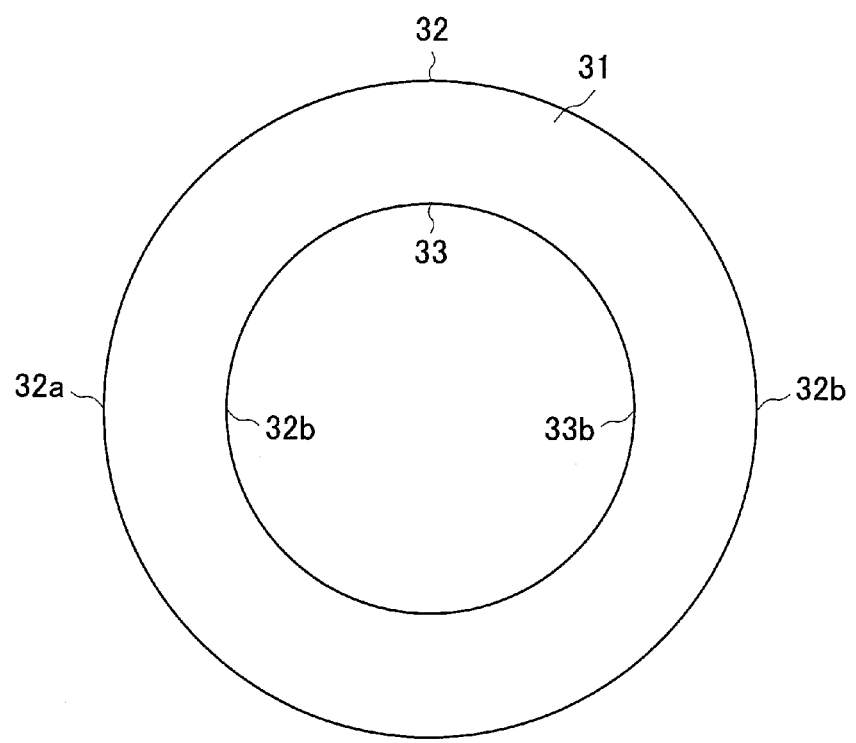
FIG. 2 is a plan view diagram along the section I-I in FIG. 1.

As illustrated in FIG. 1 and FIG. 2, the flame sensor 1 according to the Example is provided with an electron tube 2, made from a cylindrical body of a round cylindrical shape and a reflecting member 3 that is disposed facing the electron tube 2 at a specific distance of separation therefrom. Moreover, although not illustrated, a controlling device, made from an electric circuit, for detecting a flame from an electric discharge that is produced by an electrode 22, described below, included in the electron tube 2, and also for controlling the operation of the electron tube 2, may be connected to the electron tube 2.

<Structure of the Electron Tube>

The electron tube 2 is structured from an outer container 21 that is shaped, in general, as a round cylinder, an electrode 22, shaped as a flat plate, disposed within the outer container 21, and a lead 23 that is connected on the one end to the electrode 22 and that leads out, on the other end, to the outside of the outer container 21.

Here the outer container 21 is structured from glass, or the like, and the interior thereof is sealed. Such an outer container 21 may be structured from a tube portion, made from a cylindrical body that is open on both ends, a cover portion made from ultraviolet radiation-transparent glass (quartz glass) that covers one of the openings of the tube portion, and a base portion that blocks the other opening of the tube portion.

The electrode 22 is formed as a circular plate, and is made out of a metal such as tungsten, and is structured from two electrodes that have identical shapes, disposed in parallel with each other with a specific distance of separation therebetween. Note that in FIG. 1, only one electrode is shown for the light source side and the opposite side as the electrode 22, for simplicity in explanation, the electrode on the light source side being omitted.

Preferably, this electrode 22 is equipped within the outer container 21 so that the center (the center of gravity) thereof is located on the axis of the outer container 21. Moreover, preferably a circular illuminated region 221 is illuminated uniformly with ultraviolet radiation from the center portion of the electrode 22 to the neighborhood of the outer peripheral portion thereof.

The lead 23 is provided with a first lead 23a that is connected on one end to one of the electrodes of the electrode 22, and a second lead 23b that is connected on one end to the other electrode of the electrode 22. The other ends of the first lead 23a and of the second lead 23b, are connected to the controlling device, not shown.

In such an electron tube, when the electrode is illuminated with ultraviolet radiation in a state wherein a specific voltage is applied from the controlling device through the lead 23 across the pair of electrodes that structure the electrode 22, electrons are emitted from the electrode through the photoelectric effect, and the electrons are excited one after another, to form an electron avalanche to the other electrode.

<Structure of the Reflecting Member>

The reflecting member 3 is made out of a tube-shape member that has an inner peripheral surface, with a reflecting surface 31, which has been subjected to a mirror surface treatment on the inner peripheral surface. This reflecting surface 31 is formed with symmetry on the axis of the tube-shaped member, where the tangent line of the inner peripheral surface in the cross-sectional plane that contains the axis changes monotonically along the axis. In such a reflecting member 3, one opening 32 is disposed facing a light source, and the other opening 33, which has an outer dimension that is smaller than that of the opening 32, is disposed facing the electron tube 2.

This reflecting member 3 is disposed so that the axis thereof is parallel to the optical axis of the ultraviolet radiation, and so that the normal line from the center of gravity of the electrode 22 is coincident with the axis thereof. Consequently, the reflecting surface 31 of the reflecting member 3 is more distant from the axis a the nearer it is to the light source. Moreover, in the cross-section that includes the axis a, illustrated in FIG. 1, the location of the reflecting member 3 and the shape of the reflecting surface 31 are set so that ultraviolet radiation that is incident onto the reflecting surface 31 is reflected as described below.

First, the ultraviolet radiation reflected from one end portion 32a ((hereinafter termed the "light source side end portion") wherein the opening portion 32 on the light source side is formed is incident on an electrode end portion 221 a on the side near to the light source side end portion 32a, of the two end portions (hereinafter termed the "electrode end portions") of an illuminated region 221 in the electrode 22.

Moreover, the ultraviolet radiation that is reflected from the other end portion (hereinafter termed the "electron tube side end portion") at the opening 33 on the electron tube 2 side, which is continuous to the light source side end portion 32a, is incident on the electrode end portion 221b that is on the far side from the electron tube side end portion 33a.

Furthermore, the ultraviolet radiation that is reflected from the region spanning from the light source side end portion 32a to the electron tube side end portion 33a is incident across the range from the electrode end portion 221a to the electrode end portion 221b.

Similarly, the ultraviolet radiation that is reflected by the other end portion 32b (hereinafter termed the "light source side end portion") of the opening 32 on the light source side is incident on the electrode end portion 221b on the side near to the light source end portion 32b.

Moreover, the ultraviolet radiation that is reflected from the other end portion 33b (hereinafter termed the "electron tube side end portion") of the opening 33 on the electron tube 2 side, which is continuous to the light source side end portion 32b, is incident on the electrode end portion 221a of the illuminated region 221 on the side that is far from the electron tube side end portion 33b.

Furthermore, the ultraviolet radiation that is reflected from the region spanning from the light source side end portion 32b to the electron tube side end portion 33b is incident across the range from the electrode end portion 221b to the electrode end portion 221a.

That is there is an effect wherein, on the left side (the side including 32a and 33a) of the electron tube side end portion in FIG. 1, the further the location of reflection of the ultraviolet radiation is toward the light source side end portion side from the electron tube side end portion side, the further the incidence is toward the right side of the electrode, where, in contrast, on the left side (the side including 32b and 33b) of the electron tube side end portion, the further the location of reflection of the ultraviolet radiation is toward the light source side end portion side from the electron tube side end portion side, the further the incidence is toward the left side of the electrode.

Given this, after converging on point b between the reflecting member 3 and the electrode 22, the optical flux of the ultraviolet radiation that is incident on the reflecting surface 31, spanning from the light source side end portion 32a to the electron tube side end portion 33a, spreads so as to be incident on the illuminated region 221 of the electrode 22, spanning from the electrode end portion 221a to the electrode end portion 221b. Similarly, after converging on point c between the reflecting member 3 and the electrode 22, the optical flux of the ultraviolet radiation that is incident on the reflecting surface 31, spanning from the light source side end portion 32b to the electron tube side end portion 33b, spreads so as to be incident on the illuminated region 221 of the electrode 22, spanning from the electrode end portion 221b to the electrode end portion 221a.

Consequently, the ultraviolet radiation that is incident onto the reflecting surface 31 from the light source is reflected by the reflecting surface 31 to be incident across the entirety of the illuminated region 221. Consequently, the reflected light of the reflecting surface 31 is not focused on one point on the illuminated region 221, but rather illuminates the illuminated region 221 uniformly.

This reflecting member 3 may have at least the reflecting surface 31 be structured from a material that reflects ultraviolet radiation, such as a metal, such as, for example, aluminum, chrome, stainless steel, or the like, but can also be manufactured through one of a variety of methods such as plating or vapor deposition of a metal onto a molded plastic member, or may be fabricated through a process of drawing metal or a process of cutting metal.

<Operation of the Ultraviolet Radiation Detection of the Flame Sensor>

In this type of flame sensor 1, the ultraviolet radiation that is emitted from the light source toward the flame sensor 1 along the neighborhood of the axis of the electron tube 2 passes through the cover portion of the outside of the outer container 21 to arrive at the electrode 22. On the other hand, the ultraviolet radiation that arrives from the light source to the reflecting member 3 a slight distance away from the axis of the electron tube 2 is reflected by the reflecting surface 31 of the reflecting member 3 to be focused uniformly on the illuminated region 221 of the electrode 22. When the ultraviolet radiation arrives at the electrode 22, electrons are emitted, through the photoelectric effect, from the pair of electrodes 22 that structure the electrode 22, and are inputted into the controlling device through the lead 23. When electric power is input based inputted based on the emitted electrons, the controlling device evaluates the state of the flame based on this electric power.

As explained above, in the Example the ultraviolet radiation that is reflected by the one light source side end portion 32a of the opening 32 on the light source side is incident onto the electrode end portion 221 a on the side near to the end portion 32a, of the two end portions of the illuminated region 221 in the electrode 22, and the ultraviolet radiation that is reflected from the other light source side end portion 32b of the opening 32 on the light source side is incident onto the electrode end portion 221b on the side near to the end portion 32b, and the ultraviolet radiation that is reflected by the one electron tube side end portion 33a of the opening 33 on the electron tube 2 side is incident onto the electron tube side electrode end portion 221b on the side far from the end portion 33a, of the two end portions of the illuminated region 221 in the electrode 22, and the ultraviolet radiation that is reflected from the other end portion 33b of the opening 33 on the electron tube 2 side is incident onto the electrode end portion 221a of the illuminated region 221 on the side far from the end portion 33a, and thus the ultraviolet radiation that is reflected illuminates the specific region 221 of the electrode 22 uniformly.

As a result, in the Example, the ultraviolet radiation does not converge on a single point on the electrodes 22, thus preventing the localized emission of electrodes electrons from that single point, making it possible to prevent a loss of detection sensitivity.

Figure 3:
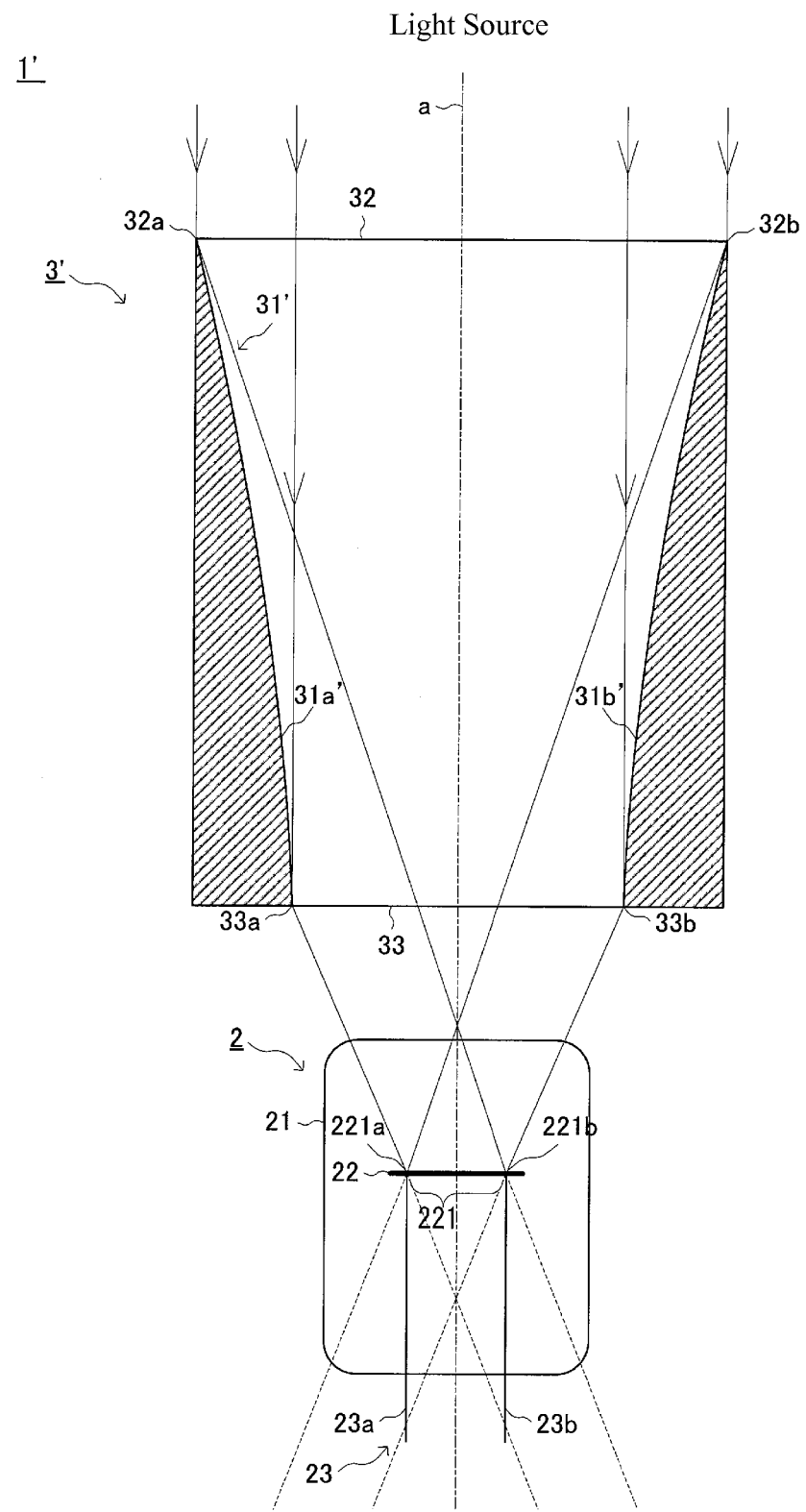
FIG. 3 is a cross-sectional diagram illustrating schematically an alternate example of a flame sensor according to an example according to the present invention.

Note that while, in the Example, the explanation was for a case wherein the cross-section of the reflecting surface 31 of the reflecting member 3 was formed in a so-called downwardly-convex curved shape, instead, as in the flame sensor 1' shown in FIG. 3, the cross-section of the reflecting surface 31' in the reflecting member 3' may be formed in a so-called upwardly-convex curved shape. In this case, in the plane that is parallel to the axis a, illustrated in FIG. 3, the location of the reflecting member 3' and the shape of the reflecting surface 31' are set so that ultraviolet radiation that is incident onto the reflecting surface 31' is reflected as described below.

First, the ultraviolet radiation reflected from one light source end portion 32a of the opening 32 on the light source side is incident on an electrode end portion 221b on the side far from the light source side end portion 32a, of the two end portions of an illuminated region 221 in the electrode 22.

Moreover, the ultraviolet radiation that is reflected from one electron tube side end portion 33a at the opening 33 on the electron tube 2 side, which is continuous to the light source side end portion 32a, is incident on the electrode end portion 221a that is on the near side to the electron tube side end portion 33a.

Furthermore, the ultraviolet radiation that is reflected from the region spanning from the light source side end portion 32a to the electron tube side end portion 33a is incident across the range from the electrode end portion 221b to the electrode end portion 221a.

That is there is an effect wherein, on the left side (the side including 32a and 33a) of the electron tube side end portion in FIG. 3, the further the location of reflection of the ultraviolet radiation is toward the light source side end portion side from the electron tube side end portion side, the further the incidence is toward the left side of the electrode, where, in contrast, on the left side (the side including 32b and 33b) of the electron tube side end portion, the further the location of reflection of the ultraviolet radiation is toward the light source side end portion from the electron tube side end portion side, the further the incidence is toward the right side of the electrode.

Similarly, the ultraviolet radiation that is reflected by the light source side other end portion 32b of the opening 32 on the light source side is incident on the electrode end portion 221a on the side far from the light source end portion 32b.

Moreover, the ultraviolet radiation that is reflected from the electron tube side end portion 33b (hereinafter termed the "electron tube side end portion") of the opening 33 on the electron tube 2 side, which is continuous to the light source side end portion 32b, is incident on the electrode end portion 221b of the illuminated region 221 on the side that is near to the electron tube side end portion 33b.

Furthermore, the ultraviolet radiation that is reflected from the region spanning from the light source side end portion 32b to the electron tube side end portion 33b is incident across the range from the electrode end portion 221a to the electrode end portion 221b.

Given this, the optical flux of the ultraviolet radiation that is incident on the reflecting surface 31', spanning from the light source side end portion 32a to the electron tube side end portion 33a, is incident on the illuminated region 221 of the electrode 22, spanning from the electrode end portion 221b to the electrode end portion 221a. Similarly, the optical flux of the ultraviolet radiation that is incident on the reflecting surface 31', spanning from the light source side end portion 32b to the electron tube side end portion 33b, is incident on the illuminated region 221 of the electrode 22, spanning from the electrode end portion 221a to the electrode end portion 221b.

Consequently, the ultraviolet radiation that is incident onto the reflecting surface 31' from the light source is reflected by the reflecting surface 31' to be incident across the entirety of the illuminated region 221. Consequently, the reflected light of the reflecting surface 31' is not focused on one point on the illuminated region 221, but rather illuminates the illuminated region 221 uniformly.

While, as explained above, it was explained that the cross-sections of the reflecting surfaces 31 and 31' may be either downwardly convex or upwardly convex, in contrast, the cross-section of the reflecting surface 31' may, of course, be simply a conical surface, rather than a curved line.

Figure 4:
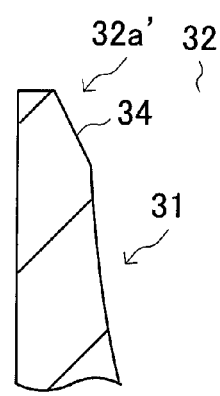
FIG. 4 is a cross-sectional diagram illustrating schematically an alternate example of a light source side end portion.
Figure 5:
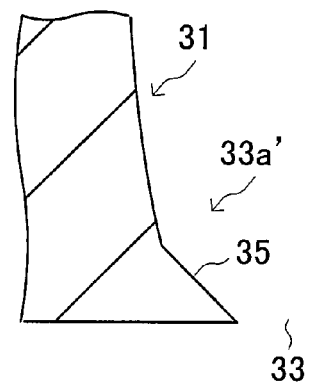
FIG. 5 is a cross-sectional diagram illustrating schematically a modified example of an electron tube side end portion.
Figure 6:
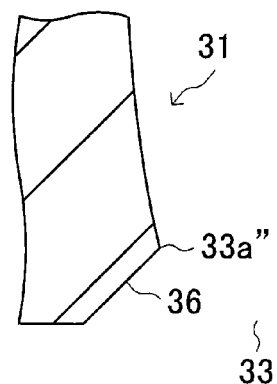
FIG. 6 is a cross-sectional diagram illustrating schematically a modified example of an electron tube side end portion.

Note that in the Example, at least one end portion on the opening 32 side on the light source side and/or on the opening 33 side on the electron tube 2 side in the reflecting surface 31 may be a conical surface. For example, as illustrated in FIG. 4, a conical surface 34 wherein the diameter expands towards the light source may be provided at the light source side end portion 32a'. Moreover, as illustrated in FIG. 5, a conical surface 35, wherein the diameter narrows towards the electron tube 2, may be formed at the electron tube side end portion 33a'. Moreover, as illustrated in FIG. 6, a conical surface 36, wherein the diameter expands towards the electron tube 2, may be formed on the opening 33 side. The provision of an appropriate conical surface enables the ultraviolet radiation that is incident on the conical surface part to be reflected toward the illuminated region 221. This makes it possible to increase uniformly the ultraviolet radiation that is incident on the illuminated region 221. Moreover, this makes it possible to expand the diameter of the opening 32 or of the opening 33, making it possible to increase the amount of ultraviolet radiation that is incident on the illuminated region 221. Furthermore, in the case of the conical surface 35 illustrated in FIG. 6, the electron tube side end portion 33a'' may be formed in a portion that connects the reflecting surface 31 and the conical surface 35.

While here the explanation was for a structure wherein a conical surface is provided at the opening on the light source side, there is no constraint to being a conical surface, but rather, for example, a curved surface that is upwardly convex may be provided.

In this case, the ultraviolet radiation acts so that the ultraviolet radiation that is reflected from the curved surface part that is downwardly convex, in the same manner as in the case in FIG. 1, on the left side of the electron tube side end portion is incident further to the right side of the electrode the further the location of reflection of the ultraviolet radiation is toward the light source side end portion side from the electron tube side end portion, and, conversely, on the right side of the electron tube side end portion, is incident further to the left side of the electrode the further the location of reflection of the ultraviolet radiation is toward the light source side end portion side from the electron tube side end portion.

On the other hand, the ultraviolet radiation acts so that the ultraviolet radiation that is reflected from the curved surface part that is upwardly convex, in the same manner as in the case in FIG. 3, on the left side of the electron tube side end portion, is incident further toward the left side of the electrode the further the location of reflection of the ultraviolet radiation is toward the light source side end portion side from the electron tube side end portion side, and, in contrast, is incident further toward the right side of the electrode the further the location of reflection of the ultraviolet radiation is toward the light source side end portion side from the electron tube side end portion side.

Together, the ultraviolet radiation that is incident from the light source onto the reflecting surface is reflected by the reflecting surface so as to be incident across the entirety of the illuminated region 221. Consequently, the reflected light of the reflecting surface is incident uniformly on the illuminated region, rather than being focused on one point of the illuminated region.

Moreover, when conical surfaces, as described above, or upwardly convex surfaces are formed on both the light source side opening 32 side and the electron tube 2 side opening 33 side in the reflecting surface 31, then the combination of these can be set freely as appropriate.

Figure 7:
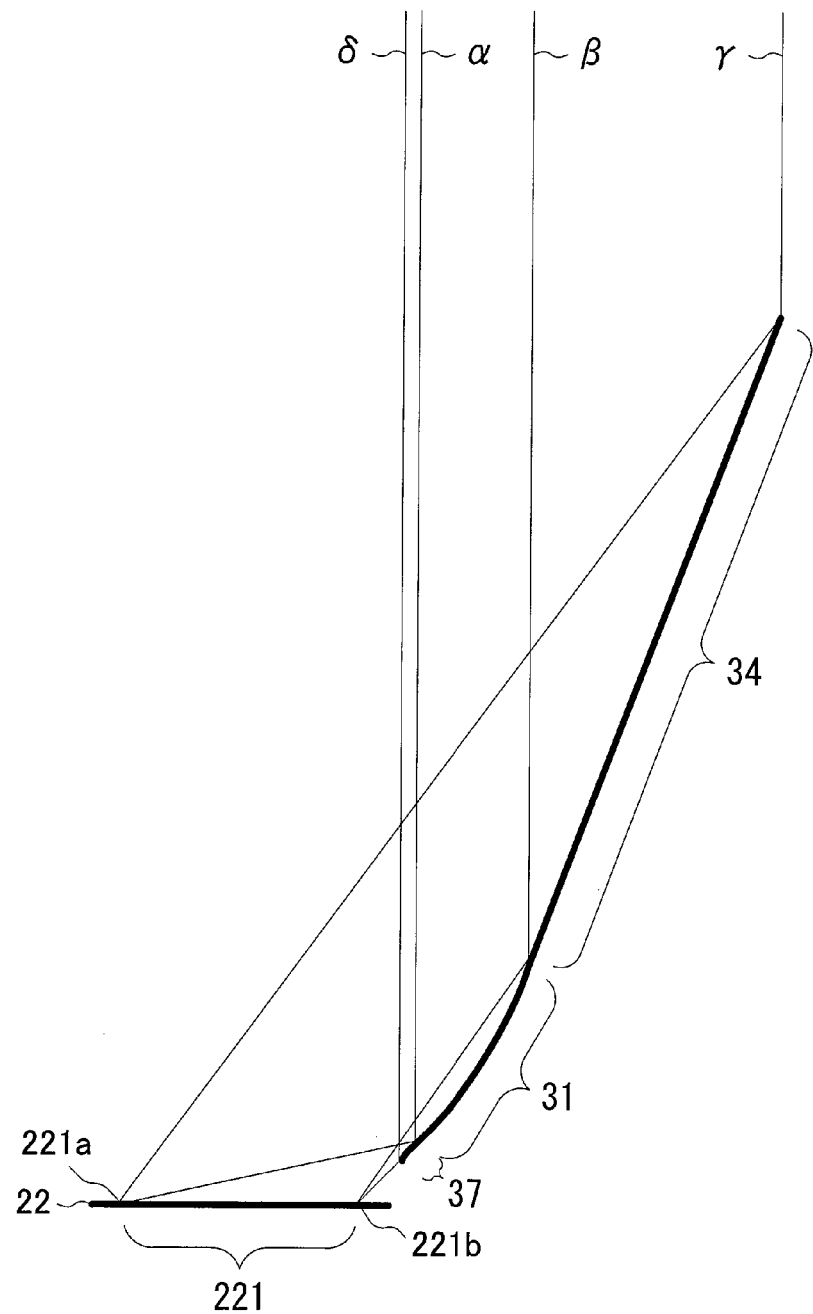
FIG. 7 is a cross-sectional diagram illustrating schematically an alternate example of a reflecting surface.

For example, as illustrated in FIG. 7, a round conical surface 34 may be provided at the opening on the light source side and an upwardly-convex surface 37 may be provided at the opening on the electrode 22 side in the reflecting surface 31. In this case, the reflected ultraviolet radiation in the range from the light beam α to the light beam β, which are reflected on the reflecting surface 31 will be incident across the range from the electrode end portion 221 a to the electrode end portion 221b of the illuminated region 221 of the electrode 22, in the same manner as in the case of the reflecting member 3 that is illustrated in FIG. 1. Moreover, the reflected ultraviolet radiation in the range from the light beam γ to the light beam β that are reflected on the conical surface 34 will be incident across the range from the electrode end portion 221a to the electrode end portion 221b of the illuminated region 221 of the electrode 22. Moreover, the reflected ultraviolet radiation in the range from the light beam a to the light beam δ that are reflected on the curved surface 37 will be incident across the range from the electrode end portion 221a to the electrode end portion 221b of the illuminated region 221 of the electrode 22. Consequently, because the reflected light from the round conical surface 34 and from the curved surface 37 is incident together with that of the reflecting surface 31 in the illuminated region 221 of the electrode 22, this enables an increase in the amount of ultraviolet radiation that is incident on the illuminated region 221.

Figure 8:
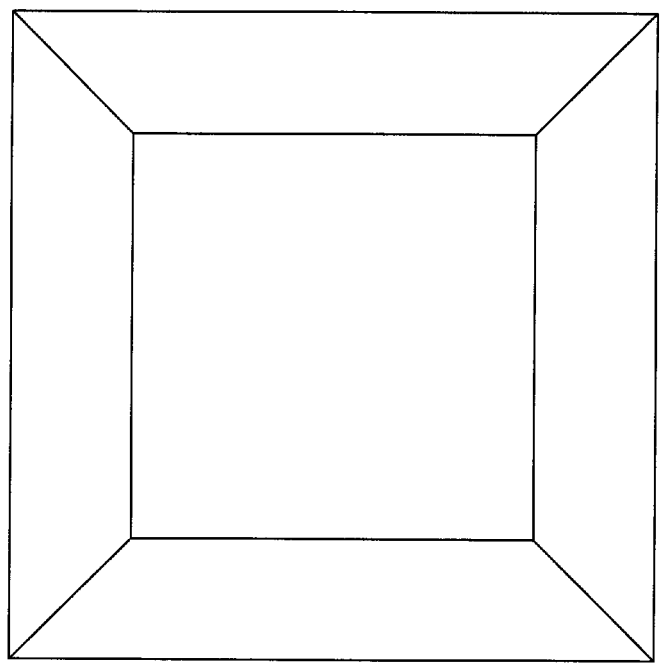
FIG. 8 is a plan view diagram illustrating schematically an alternate example of a reflecting member.

Note that while in FIG. 8 the explanation was for an example of a case wherein a round conical surface is provided on the light source side opening 32 side in the reflecting surface 31 and an upwardly-convex curved surface is provided on the electrode 22 side opening 33 side, the shapes of the reflecting surfaces formed at these locations are not limited to round conical surfaces or convex curved surfaces, but rather may be set freely as appropriate, such as to the downwardly-convex curved surface described above. In this case, a round conical surface or an upwardly-convex surface is particularly preferable on the light source side opening 32 side, and a round conical surface or an upwardly-convex curved surface is particularly preferable on the electrode 22 side opening 33 side. Such a structure makes it possible to prevent the occurrence of a point of inflection anywhere across the entirety of the reflecting surface.

Furthermore, while in the Example the explanation was for a case wherein the opening of the reflecting member 3 was formed in the shape of a circle, the shape of the opening is not limited to that of a circle, but rather may be set freely as appropriate depending on the shape of the region illuminated by the electromagnetic radiation, such as ultraviolet radiation. For example, as illustrated in FIG. 8, the shape of the opening may be a square, when viewed in the plan view.

Moreover, while, in the Example, the explanation was for an example of a case applied to a flame sensor for detecting ultraviolet radiation, it may, of course, be applied to a variety of different devices insofar as the device is one wherein electromagnetic radiation, including light, or sound waves, or the like, are focused. For example, it can be applied to a variety of devices such as projecting/focusing components in photoelectric sensors, reflecting components in microbe sensors, directional speakers, directional microphones, direc-tional electromagnetic antennas, radio telescopes, x-ray telescopes, directional optical projectors, replacements for microlenses in CCD's, reflecting plates in solar cookers, and so forth.

Another Example

Another Example according to the present invention will be explained next. Note that in the Another Example the shape is different from that of the reflecting member 3 of the Example, described above. Consequently, in the Another Example identical names and identical codes are assigned to structural elements that are identical to those in the Example, and explanations thereof are omitted as appropriate.

<Structure of the Flame Sensor>

Figure 9:
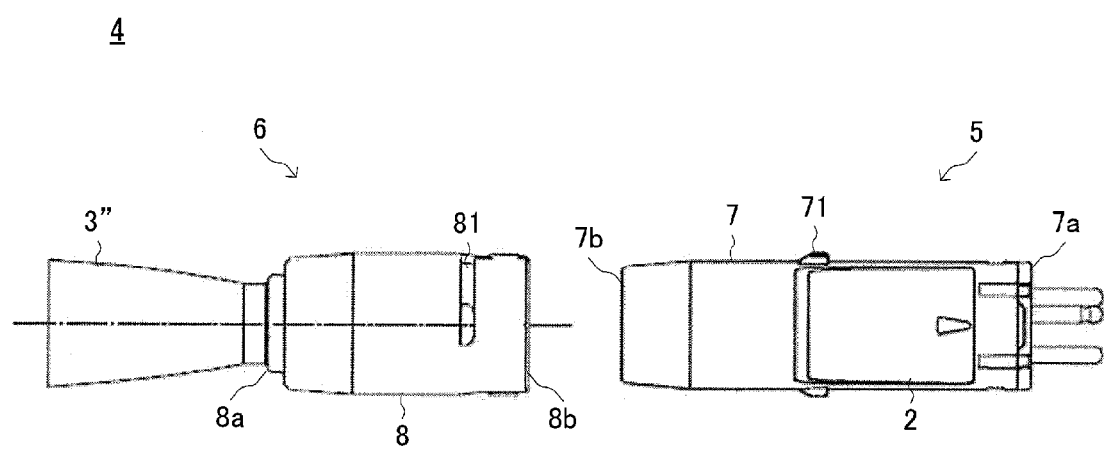
FIG. 9 is a diagram illustrating schematically a structure for a flame sensor according to Another Example according to the present invention.
Figure 10:
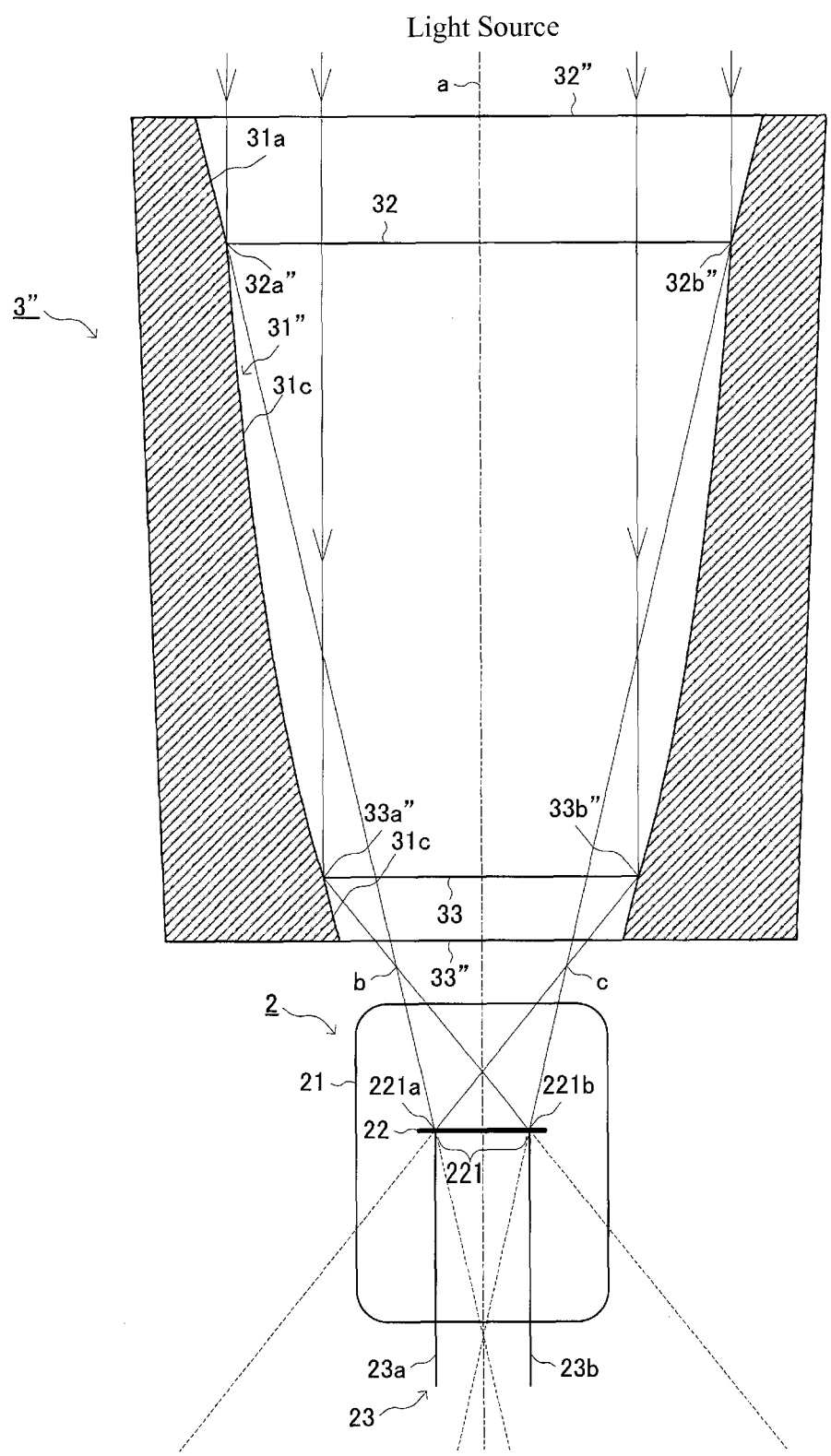
FIG. 10 is a cross-sectional diagram illustrating schematically the vicinity of a reflecting member 3" in FIG. 9.

As illustrated in FIG. 9 and FIG. 10, the flame sensor 4 in the Another Example is provided with an electron tube unit 5 and a reflecting member unit 6 that is attached to the electron tube unit 5.

The electron tube unit 5 is structured from an electron tube 2 and a case 7 wherein the electron tube 2 is installed.

Here the case 7 is formed in a round tube shape, and the electron tube 2 is disposed therein. A lead 23 of the electron tube 2 leads out from one opening 7a of the case 7. The electrode 22 of the electron tube 2 is exposed from the other opening 7b of the case 7. A tab portion 71, which protrudes toward the outside, is formed on the outer peripheral surface of this case 7. The tab portion 71 is used in connecting the electron tube unit 5 and the reflecting member unit 6.

The reflecting member unit 6 is structured from a reflecting member 3" and a supporting member 8 for supporting this reflecting member 3.

Here the supporting member 8 is formed in a round tube shape, and the reflecting member 3" is secured in one opening 8a. A hole portion 81 is formed on the supporting member 8 side portion. The tab portion 71 fits together with the hole portion 81. Moreover, the inner diameter of the supporting member 8 corresponds to the outer diameter of the case 7 opening 7b side. The interior of the reflecting member 3" is exposed on the other opening 8b side of the supporting member 8.

<Structure of the Reflecting Member>

The reflecting member 3" is made from a tube-shaped member having an inner peripheral surface, such as illustrated in FIG. 10. The inner peripheral surface, in a state wherein the flame sensor 4 has been assembled, has a part (hereinafter termed the "light source side inner peripheral surface") 31 a from the light source side opening 32" side end portion to a specific location in the reflecting member 3", a part (hereinafter termed the "electron tube side inner peripheral surface") 31b from the end portion on the opening 33" side of the electron tube 2 side to a specific location in the reflecting member 3", and a part (hereinafter termed the "reflecting surface") 31c between the light source side inner peripheral surface 31 a and the electron tube side inner peripheral surface 31b.

Note that for simplicity in explanation, in FIG. 10 the electron tube 2, the reflecting member 3, and the supporting member 82 are extracted from the assembled flame sensor 4 for illustration, and the other structural elements are not illustrated.

Here a mirror surface treatment is performed on the reflecting surface 31c. This reflecting surface 31c is formed with symmetry on the axis of the reflecting member 3", which is formed in a tube shape, where the tangent line of the inner peripheral surface in the cross-sectional plane that contains the axis changes monotonically along the axis.

On the other hand, no mirrored surface process is performed on the light source side inner peripheral surface 31a nor on the electron tube side inner peripheral surface 31b. Moreover, the inner peripheral surface tangent lines for the light source side inner peripheral surface 31a and the electron tube side inner peripheral surface 31b are straight lines.

In such a reflecting member 3", one opening 32" is disposed facing a light source, and the other opening 33", which has an outer dimension that is smaller than that of the opening 32", is disposed facing the electrodes 22 of the electron tube 2.

Moreover, reflecting member 3" is disposed so that the axis thereof is parallel to the optical axis of the ultraviolet radiation, and so that the normal line from the center of gravity of the electrode 22 is coincident with the axis thereof. Consequently, the reflecting surface 31 of the reflecting member 3c is more distant from the axis a the nearer it is to the light source.

In this way, in the Another Example, of the reflecting surfaces that structure the reflecting member 3", the reflecting surface 31c between the reflecting surface 31a and the reflecting surface 31b that are located at both end portions corresponds to the reflecting surface 31 in the Example, and the infrared radiation is reflected by the reflecting surface 31c. Consequently, in the cross-section that includes the axis a, illustrated in FIG. 10, the location of the reflecting member 3" and the shape of the reflecting surface 31 are set so that ultraviolet radiation that is incident onto the reflecting surface 31 is reflected as described below.

First, the ultraviolet radiation that passes through the opening 32" on light source side and is reflected from one end portion 32a" (hereinafter termed the "light source side end portion") that forms the boundary between the light source side inner peripheral surface 31a and the reflecting surface 31c is formed is incident on an electrode end portion 221a on the side near to the light source side end portion 32a", of the two end portions (hereinafter termed the "electrode end portions") of an illuminated region 221 in the electrode 22.

Moreover, the ultraviolet radiation that is reflected from the other end portion (hereinafter termed the "electron tube side end portion") 33a", which forms the boundary between the reflecting surface 31c and the electron tube side inner peripheral surface 31b, and which is continuous to the light source side end portion 32a", is incident on the electrode end portion 221b that is on the far side from the electron tube side end portion 33a" of the two electrode end portions of the illuminated region 221 of the electrode 22.

Furthermore, the ultraviolet radiation that is reflected from the region spanning from the light source side end portion 32a" to the electron tube side end portion 33a" is incident across the range from the electrode end portion 221a to the electrode end portion 221b.

Similarly, the ultraviolet radiation that is reflected by the other end portion 32b" (hereinafter termed the "light source side end portion") where the boundary between the light source side inner peripheral surface 31a and the reflecting surface 31c is formed is incident on the electrode end portion 221b on the side near to the light source end portion 32b".

Moreover, the ultraviolet radiation that is reflected from the other end portion 33b" (hereinafter termed the "electron tube side end portion") where the boundary between the reflecting surface 31c and the electron to side inner peripheral surface 31b is formed, and which is continuous with the light source side end portion 32b", is incident on the electrode end portion 221a of the illuminated region 221 on the side that is far from the electron tube side end portion 33b".

Furthermore, the ultraviolet radiation that is reflected from the region spanning from the light source side end portion 32b" to the electron tube side end portion 33b" is incident across the range from the electrode end portion 221b to the electrode end portion 221a.

That is there is an effect wherein, on the left side (the side including 32a" and 33a") of the electron tube side end portion in FIG. 9, the further the location of reflection of the ultraviolet radiation is toward the light source side end portion side from the electron tube side end portion side, the further the incidence is toward the right side of the electrode, where, in contrast, on the left side (the side including 32b" and 33b") of the electron tube side end portion, the further the location of reflection of the ultraviolet radiation is toward the light source side end portion side from the electron tube side end portion side, the further the incidence is toward the left side of the electrode.

Given this, after converging on point b between the reflecting member 3" and the electrode 22, the optical flux of the ultraviolet radiation that is incident on the reflecting surface 31c, spanning from the light source side end portion 32a" to the electron tube side end portion 33a", spreads so as to be incident on the illuminated region 221 of the electrode 22, spanning from the electrode end portion 221a to the electrode end portion 221b. Similarly, after converging on point c between the reflecting member 3" and the electrode 22, the optical flux of the ultraviolet radiation that is incident on the reflecting surface 31c, spanning from the light source side end portion 32b" to the electron tube side end portion 33b", spreads so as to be incident on the illuminated region 221 of the electrode 22, spanning from the electrode end portion 221b to the electrode end portion 221a.

Consequently, the ultraviolet radiation that is incident onto the reflecting surface 31c from the light source is reflected by the reflecting surface 31c to be incident across the entirety of the illuminated region 221. Consequently, the reflected light of the reflecting surface 31c is not focused on one point on the illuminated region 221, but rather illuminates the illuminated region 221 uniformly.

<Method for Assembling the Flame Sensor>

Such a flame sensor 4 is assembled as follows.

First, after causing the opening 7b at the other end side of the case 7 of the electron tube unit 5 to face the opening 8b of a fitting portion 81 in the supporting member 8 of the reflecting member unit 6 to face each other, the other end of the case 7 is inserted into the opening 8b. When the case 7 is inserted to a specific location, the tab portion 71 arrives at the hole portion 81, and is fitted into this hole portion 81. The result is that they are connected together with the reflecting member unit 6 and the electron tube unit 5 fitted together.

<Operation of the Ultraviolet Radiation Detection of the Flame Sensor>

Next the ultraviolet radiation detecting operation of the flame sensor according to the Another Example will be explained in reference to FIG. 10.

As illustrated in FIG. 10, the ultraviolet radiation that is emitted from the light source toward the flame sensor 4 along the neighborhood of the axis of the electron tube 2 passes through the cover portion of the outside of the outer container 21 to arrive at the electrode 22.

On the other hand, the ultraviolet radiation that arrives from the light source to the reflecting member 3" a slight distance away from the axis of the electron tube 2 is reflected by the reflecting surface 31c of the reflecting member 3" to be focused uniformly on the illuminated region 221 of the electrode 22.

When the ultraviolet radiation arrives at the electrode 22, electrons are emitted, through the photoelectric effect, from the pair of electrodes 22 that structure the electrode 22, and are inputted into the controlling device through the lead 23. When electric power is input based inputted based on the emitted electrons, the controlling device evaluates the state of the flame based on this electric power.

As explained above, in the Another Example, even in a case wherein the reflecting surface 31c between the reflecting surface 31a and the reflecting surface 31b at both end portions, of the inner peripheral surface that forms the reflecting member 3", is used as the reflecting surface, the ultraviolet radiation does not converge on a single point on the electrodes 22, thus preventing the localized emission of electrodes electrons from that single point, making it possible to prevent a loss of detection sensitivity.

Note that in the Another Example as well, the cross-section of the reflecting surface may be an upwardly-convex curved line in the same manner as for the reflecting member 31' illustrated in FIG. 3.

Note also that even in the Another Example, the light source side inner peripheral surface 31a and/or the electron tube side inner peripheral surface 31b may form a conical surface or an upwardly-convex curve, as illustrated in FIG. 4 through FIG. 6.

Figure 11:
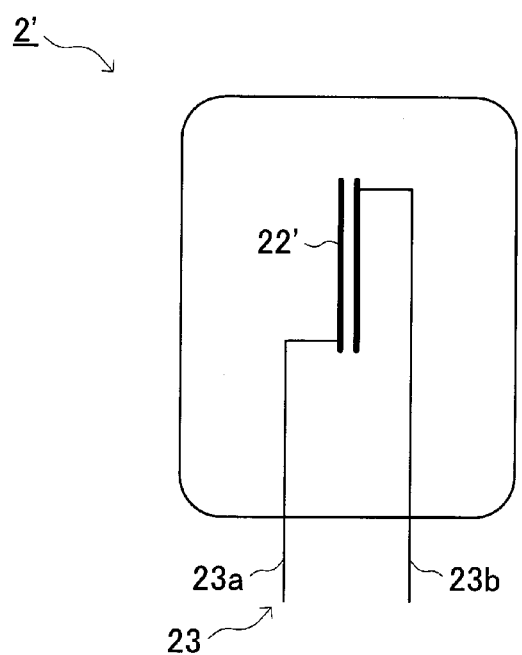
FIG. 11 is a plan view diagram illustrating schematically an alternate example of an electron tube.

Moreover, while in the Example and Another Example the explanations were of examples of cases wherein an electron tube 2 was used wherein the flat face of the electrode 22 was disposed so as to be perpendicular to the optical axis, there is no limitation to the structure of the electron tube 2, but rather various different types of electron tubes may be used. For example, an electron tube 2' wherein the flat surface of the electrode 22' is disposed in parallel to the optical axis, as illustrated in FIG. 11, may be used. Even in this case, the ultraviolet radiation does not converge on a single point on the electrodes 22', thus preventing the localized emission of electrodes electrons from that single point, making it possible to prevent a loss of detection sensitivity.

Moreover, in the Another Example as well, the shape of the opening of the reflecting member 3" is not limited to being circular, but various different shapes may be used.

The present invention can be applied to a variety of devices that reflect and focus electromagnetic radiation.

Obviously, numerous modifications and variations of the present invention are possible in light of the above teachings. It is therefore to be understood that within the scope of the appended claims, the invention may be practiced otherwise than as specifically described herein.

The invention claimed is:

1. A reflecting member comprising:
a tube-shaped member, comprising:
an inner peripheral surface;
a larger opening having a first outer edge; and
a smaller opening, opposite the larger opening, having a second outer edge;
a reflecting surface structured with the inner peripheral surface formed symmetrically on an axis of the tube-shaped member, wherein
a slope, relative to the axis, of a tangent line of the inner peripheral surface in a cross-sectional plane that contains the axis changes monotonically along the axis, and
in relation to a target that is positioned facing the smaller opening of the tube-shaped member, positioned at a specific distance of separation therefrom, and having a flat region that is perpendicular to the axis and that is axially symmetrical relative to the axis, of an electromagnetic radiation that is incident along the axis from the larger opening of the tube-shaped member and is reflected by the inner peripheral surface,
wherein electromagnetic radiation that is reflected at the first outer edge on the larger opening is incident on one end side of the flat region,
wherein electromagnetic radiation that is reflected from the second outer edge on the smaller opening side is incident on the other end side of the flat region, and
wherein the electromagnetic radiation is distributed uniformly across the flat region.

2. The reflecting member as set forth in claim 1, wherein at least one end portion of the inner peripheral surface forms a conical surface.

3. A flame sensor comprising:
a reflecting member made from a tube-shaped member, comprising:
an inner peripheral surface
comprising a reflecting surface that is formed symmetrically on an axis of the tube-shaped member;
a larger opening having a first outer edge; and
a smaller opening, opposite the larger opening, having a second outer edge;
an electron tube having a flat plate-shaped electrode sealed within the tube, and
is disposed perpendicular to the axis and axially symmetrical relative to the axis, on the smaller opening side of the reflecting member;
wherein electromagnetic radiation that is incident along the axis from a larger opening of the tube-shaped member and reflected by the inner peripheral surface at the first outer edge on the larger opening side is incident on one end of the electrode,
wherein electromagnetic radiation that is reflected from the second outer edge on the smaller opening side, is incident on the other end of the electrode, and
wherein the electromagnetic radiation is distributed uniformly across the electrode.

4. The flame sensor of claim 3, wherein the electromagnetic radiation reflected by the first outer edge and the electromagnetic radiation reflected by the second outer edge intersect before becoming incident on the electrode.

5. The flame sensor of claim 3, wherein the electromagnetic radiation reflected by the first outer edge and the electromagnetic radiation reflected by the second outer edge do not converge before becoming incident on the electrode.

* * * * *